(12) United States Patent
Onodera et al.

(10) Patent No.: US 6,186,268 B1
(45) Date of Patent: Feb. 13, 2001

(54) ELECTRIC POWER STEERING UNIT

(75) Inventors: Tsugio Onodera, Azuma-mura; Yoshiaki Taniguchi, Oi-machi, both of (JP)

(73) Assignee: Mitsuba Corporation, Gunma (JP)

(*) Notice: Under 35 U.S.C. 154(b), the term of this patent shall be extended for 0 days.

(21) Appl. No.: 09/232,536

(22) Filed: Jan. 18, 1999

(30) Foreign Application Priority Data

Jan. 20, 1998 (JP) .................................. 10-008365

(51) Int. Cl.$^7$ ........................................................ B62D 5/04
(52) U.S. Cl. ........................ 180/444; 74/459; 74/388 PS
(58) Field of Search .................................. 180/444, 443, 180/446; 74/388 PS, 459; D15/143

(56) References Cited

U.S. PATENT DOCUMENTS

| | | | |
|---|---|---|---|
| 4,572,314 | * 2/1986 | Anguera | 74/388 PS |
| 4,825,972 | * 5/1989 | Shimizu | 180/444 |
| 4,938,090 | * 7/1990 | Brusasco | 74/459 |
| 5,083,626 | 1/1992 | Abe et al. | 180/79.1 |
| 5,127,285 | * 7/1992 | Granhom | 74/527 |
| 5,228,353 | * 7/1993 | Katahira et al. | 74/89.15 |
| 5,786,754 | * 7/1998 | Parker | 340/476 |
| 5,971,094 | * 10/1999 | Joshita | 180/444 |
| 5,988,311 | * 11/1999 | Kuribayashi et al. | 180/444 |

FOREIGN PATENT DOCUMENTS

| | | |
|---|---|---|
| 8-207797 | 8/1996 | (JP) . |
| 9-104351 | 4/1997 | (JP) .................................. B62D/5/04 |
| 9-109906 | 4/1997 | (JP) .................................. B62D/5/04 |
| 9-142315 | 6/1997 | (JP) .................................. B62D/5/04 |

* cited by examiner

*Primary Examiner*—Brian L. Johnson
*Assistant Examiner*—Avraham H. Lerner
(74) *Attorney, Agent, or Firm*—McCormick, Paulding & Huber LLP

(57) ABSTRACT

An electric power steering unit comprises a rack-shaft 2 to be coupled to the guiding wheels of a vehicle, an electric motor 1 coaxially arranged around the rack-shaft 2, a ball screw mechanism 3 for connecting a nut section 19 with a screw section 30 of the rack-shaft 2 by disposing ball 31 therebetween and for transmitting the rotary power of the motor 1 to the rack-shaft 2 as assisting power for steering, and a housing B comprising an angular bearing 4 for rotatably supporting the ball screw mechanism 3. The angular bearing 4 comprising outer rings 33a, 33b pressed and fixed in an axial direction in the housing B by an outer ring fixing ring 32, and balls 34a, 34b which is provided between the rings 33a, 33b and the nut 19 and which is in contact with the nut 19 at a position where a stress is not caused at the ball 31 by a pressure force applied to the rings 33a, 33b.

10 Claims, 6 Drawing Sheets

*Prior Art*

ELECTRIC POWER STEERING UNIT

BACKGROUND OF THE INVENTION

1. Field of the Invention

This invention relates to an electric power steering unit to be used for a vehicle and, more particularly, it relates to a field of technology effectively applicable to electric power steering gears to be used for rack and pinion type steering systems.

2. Related Art Statement

In recent years, most vehicles are equipped with a so-called power steering gear, and various type power steering unit, such as a hydraulically or electrically operated type power steering unit has been designed to assist the steering power of the vehicle. In these electric power steering units, as one for applicable to rack and pinion type steering systems, a unit which the steering assisting power is obtained by an electric motor arranged coaxially with a rack-shaft is known. FIG. 5 is a cross-sectional view showing the structure of a conventional electric power steering unit, and FIG. 6 is an enlarged view showing the main part of the unit shown in FIG. 5.

An electric power steering unit shown in FIG. 5, comprises an electric motor 52 arranged coaxially with a rack-shaft 51 so that the steering assisting power generated by the electric motor 52 is transmitted to the rack-shaft 51 by way of a ball screw mechanism 53. Then, the guiding wheels of the vehicle can be turned by utilizing both the manual steering power of the driver and the steering assisting power.

The rack-shaft 51 is linked to the guiding wheels typically by way of tie rods or knuckle arms arranged at the respective opposite ends thereof and also linked to the steering column 54 that is coupled to the steering wheel (which hereinafter may be referred to as "the handle") by way of a rack and pinion gear so that it may be reciprocatively moved in the horizontal directions of FIG. 5 as the steering operation by the driver. The electric motor 52 has a cylindrical yoke 55 containing coaxially therein a cylindrical armature shaft 56 and a field device 57 and is fed with power from a power supply section 58. The field device 57 comprises magnets 59 arranged on the inner peripheral portion of the yoke 55 and an armature core 60 arranged on the outer peripheral portion of the armature shaft 56. The rotary power generated by the electric motor 52 is transmitted to the rack-shaft 51 and the power is converted into the reciprocatively movement by way of a ball screw mechanism 53 arranged at the left end of the armature shaft 56 in FIG. 5, so that steering power is assisted.

Meanwhile, in the power steering device shown in FIG. 5, the ball screw mechanism 53 comprises a nut section 62 and a screw section 63, and the nut 62 and the screw 63 are coupled without backlash by balls 64. The nut 62 of the ball screw mechanism 53 is supported to be rotatable in the housing 61 by an angular bearing 65.

In this case, a spacer 71 for arranging the angular bearing 65 and the nut 62 to be coaxial with each other is provided therebetween as shown in FIG. 6. The inner ring side of the angular bearing 65 is fixed by an inner ring fixing ring 74 screwed on an outer circumferential portion of the spacer 71 and by the flange 75 of the spacer 71, and the outer ring side of the angular bearing 65 is fixed by an outer ring fixing ring 72 screwed on an inner circumferential portion of the housing 61 and by a stepped section 73 of the housing 61. Meanwhile, the nut 62 is contained inside the spacer 71, and the nut 62 is fixed by a nut fixing ring 76 screwed on an inner circumferential portion of the spacer 71. Further, in this manner, the nut 62 is rotatably supported and fixed in the housing 61 through the spacer 71 by the angular bearing 65.

However, since the angular bearing 65 and the nut 62 are separated from each other in a conventional power steering unit, the spacer 71 as described above is required in order to arrange the bearing 65 and the nut 62 to be coaxial with each other. Therefore, there is a problem that the number of components is increased to raise the costs of products. Hence, there recently was a proposal for an unit in which the nut 62 and the inner ring of the angular bearing 65 are integrated with each other, like the electric power steering unit according to Japanese Patent Application Laid Open No. 9-104351. In this application, the ball screw nut is supported in the housing without using the spacer 71 to reduce the number of components and the size of the product.

Meanwhile, as shown in FIG. 7, there is another conventional power steering unit in which one end side of a ball screw nut 81 is received by a thrust bearing 82 and the other end side thereof is supported by an angular bearing 83. In this case, a pre-load pressure is applied in the axial direction to a pressure member 89 and a fixing screw ring 90, and the nut 81 is contained and maintained in a lower housing 88 under the pre-load pressure. In addition, a circulation passage 84 is formed inside the nut 81, and balls 85 move in the passage 84 thereby smoothly converting rotation of the nut 81 into movement in the lateral direction of a rack shaft 87.

However, since this power steering unit is arranged such that a pre-load pressure is applied to the angular bearing 82 when the nut 81 is fixed into the housing, there is a problem that this pressure is transmitted to balls 85 through the nut 81 and a stress is caused at the balls 85 against the pressure thereby deforming the balls 85. There also is a problem that a force from the angular bearing 82 is applied to the passage 84 for circulating the balls 85, so that the passage 84 is deformed and the rolling of the balls 85 is disturbed.

SUMMARY OF THE INVENTION

The object of the present invention is to provide an electric power steering unit arranged such that the support structure of the ball screw mechanism is simplified and a force is not applied to the balls or a circulation passage when fixing its nut.

According to the invention, there is provided an electric power steering unit comprising a rack-shaft to be coupled to the guiding wheels of a vehicle, an electric motor coaxially arranged around the rack-shaft to supply assisting power to the rack-shaft, a ball screw mechanism for connecting a nut section linked to the armature shaft of the electric motor with a screw section formed on the rack-shaft by disposing ball members therebetween and for transmitting the rotary power of the electric motor to the rack-shaft as assisting power for steering, and a housing comprising a bearing for rotatably supporting the ball screw mechanism. The bearing comprising an outer ring pressed and fixed in an axial direction in the housing by a pre-load pressure member, and a rolling member which is provided between the outer ring and the nut section of the ball screw mechanism and which is in contact with the nut section at a position where a stress is not caused at a ball member of the ball screw mechanism by a pressure force applied to the outer ring.

Preferably, the outer ring comprises two ring members separated from each other in an axial direction, and the rolling member is provided between the ring members and both corner portions opposed to the ring members of the nut section.

Still preferably, the outer ring comprises two ring members separated from each other in an axial direction, the nut section has a flange section projecting in a radial direction, and the rolling member is provided between a side surface portion of the flange section and the two ring members.

Also, according to the invention, there is provided an electric power steering unit comprising a rack-shaft to be coupled to the guiding wheels of a vehicle, an electric motor coaxially arranged around the rack-shaft to supply assisting power to the rack-shaft, a ball screw mechanism for connecting a nut section linked to the armature shaft of the electric motor with a screw section formed on the rack-shaft by disposing ball members therebetween and for transmitting the rotary power of the electric motor to the rack-shaft as assisting power for steering, and a housing comprising a bearing for rotatably supporting the ball screw mechanism. The bearing comprises an outer ring pressed and fixed in an axial direction in the housing by a pre-load pressure member, and a rolling member which is provided between the outer ring and the nut section of the ball screw mechanism and which is in contact with the nut section at position where a pressure force applied to the outer ring is not applied to a circulation passage for circulating a ball member of the ball screw mechanism.

Preferably, the outer ring comprises two ring members separated from each other in an axial direction, and the rolling member is provided between the ring members and both corner portions opposed to the ring members of the nut section.

Still preferably, the outer ring comprises two ring members separated from each other in an axial direction, the nut section has a flange section projecting in a radial direction, and the rolling member is provided between a side surface portion of the flange section and the two ring members.

Further, according to the invention, there is provided an electric power steering unit comprising a rack-shaft to be coupled to the guiding wheels of a vehicle, an electric motor coaxially arranged around the rack-shaft to supply assisting power to the rack-shaft, a ball screw mechanism for connecting a nut section linked to the armature shaft of the electric motor with a screw section formed on the rack-shaft by disposing ball members therebetween and for transmitting the rotary power of the electric motor to the rack-shaft as assisting power for steering, and a housing comprising a bearing for rotatably supporting the ball screw mechanism. The bearing comprises an outer ring pressed and fixed in an axial direction in the housing by a pre-load pressure member, an inner ring fixed to the nut section of the ball screw mechanism, and a rolling member provided between the outer ring and the inner ring, and the inner ring is fixed to the nut section at a position where a stress is not caused at a ball member of the ball screw mechanism by a pressure force applied to the outer ring.

Preferably, the inner ring is fixed to both corner portions of the nut section.

Furthermore, according to the invention, there is provided an electric power steering unit comprising a rack-shaft to be coupled to the guiding wheels of a vehicle, an electric motor coaxially arranged around the rack-shaft to supply assisting power to the rack-shaft, a ball screw mechanism for connecting a nut section linked to the armature shaft of the electric motor with a screw section formed on the rack-shaft by disposing ball members therebetween and for transmitting the rotary power of the electric motor to the rack-shaft as assisting power for steering, and a housing comprising a bearing for rotatably supporting the ball screw mechanism. The bearing comprises an outer ring pressed and fixed in an axial direction in the housing by a pre-load pressure member, an inner ring fixed to the nut section of the ball screw mechanism, and a rolling member provided between the outer ring and the inner ring. The inner ring is fixed to the nut section at a position where a pressure force applied to the outer ring is not applied to a circulation passage for circulating a ball member of the ball screw mechanism.

Preferably, the inner ring is fixed to both corner portions of the nut section.

Further, in this manner, a stress is prevented from being caused at the ball of the ball screw mechanism by the pressure force applied to the bearing when attaching the nut and a force is prevented from being applied to the circulation passage. Accordingly, the balls and passage can be prevented from being deformed.

The above-described and other objects, and novel feature of the present invention will become apparent more fully from the description of the following specification in conjunction with the accompanying drawings.

DESCRIPTION OF THE PREFERRED EMBODIMENT

Figure 1:
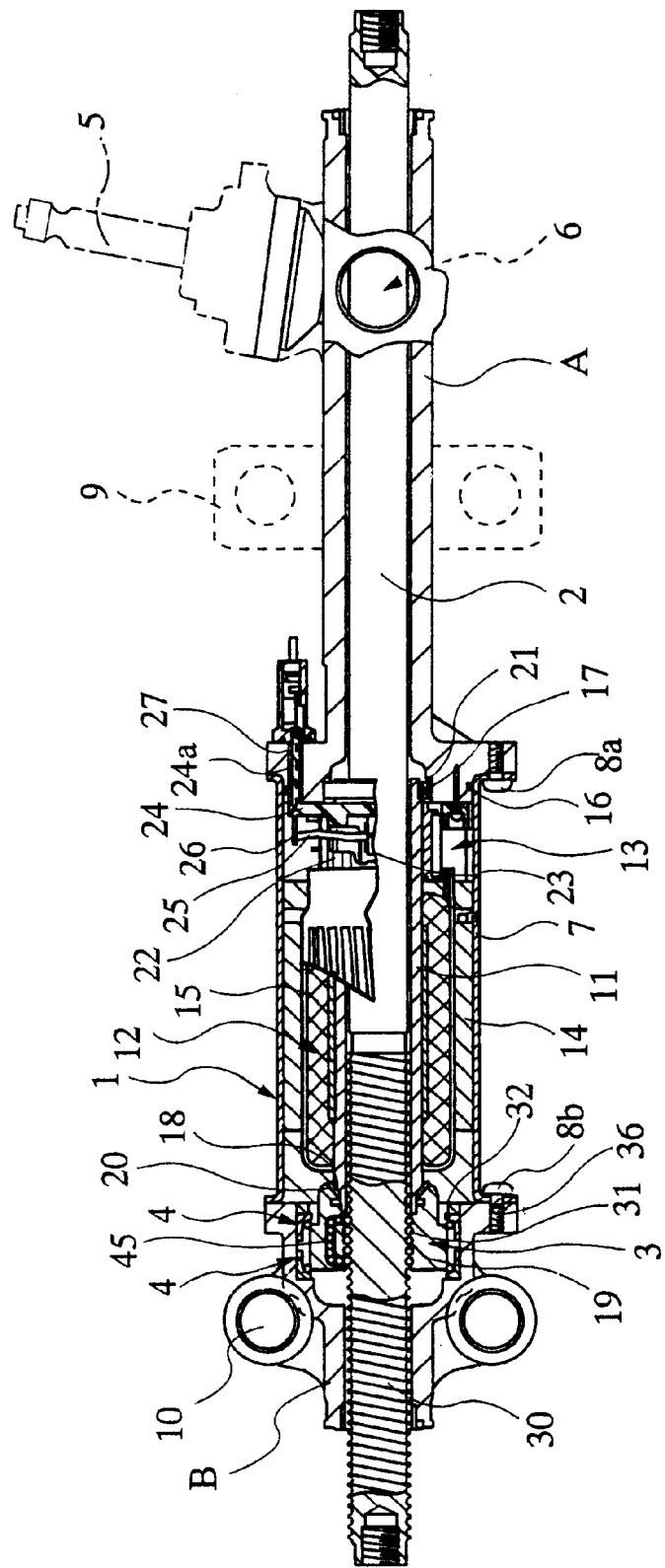
FIG. 1 is a cross-sectional view showing the entire structure of the electric power steering unit as the embodiment 1 of the present invention.
Figure 2:
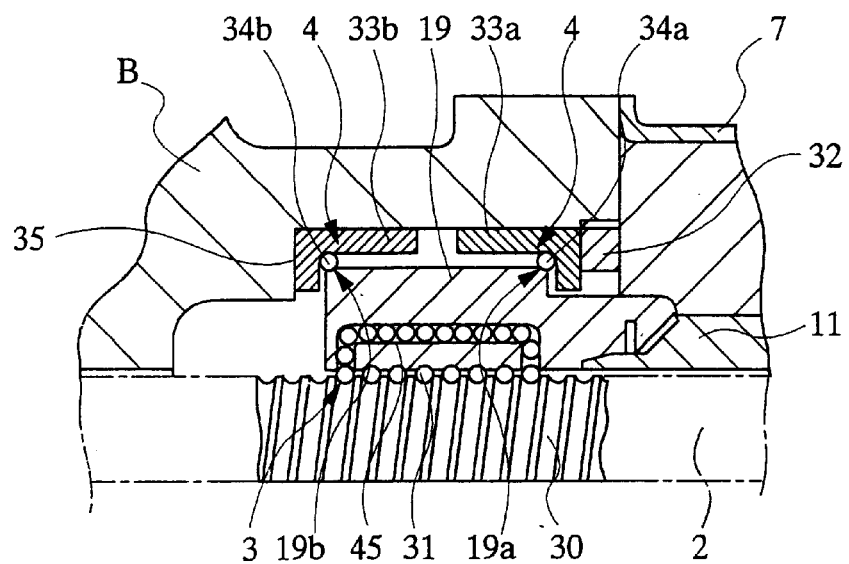
FIG. 2 is an enlarged cross-sectional view showing the main part of the electric power steering unit shown in FIG. 1.

Now, the invention will be described in greater detail by referring to the accompanying drawings that illustrate preferred embodiments of the invention. FIG. 1 is a schematic cross sectional view of a first embodiment of electric power steering unit according to the invention, showing its overall configuration. FIG. 2 is an enlarged cross sectional partial view of the embodiment of power steering unit of FIG. 1, showing its principal area.

Figure 5:
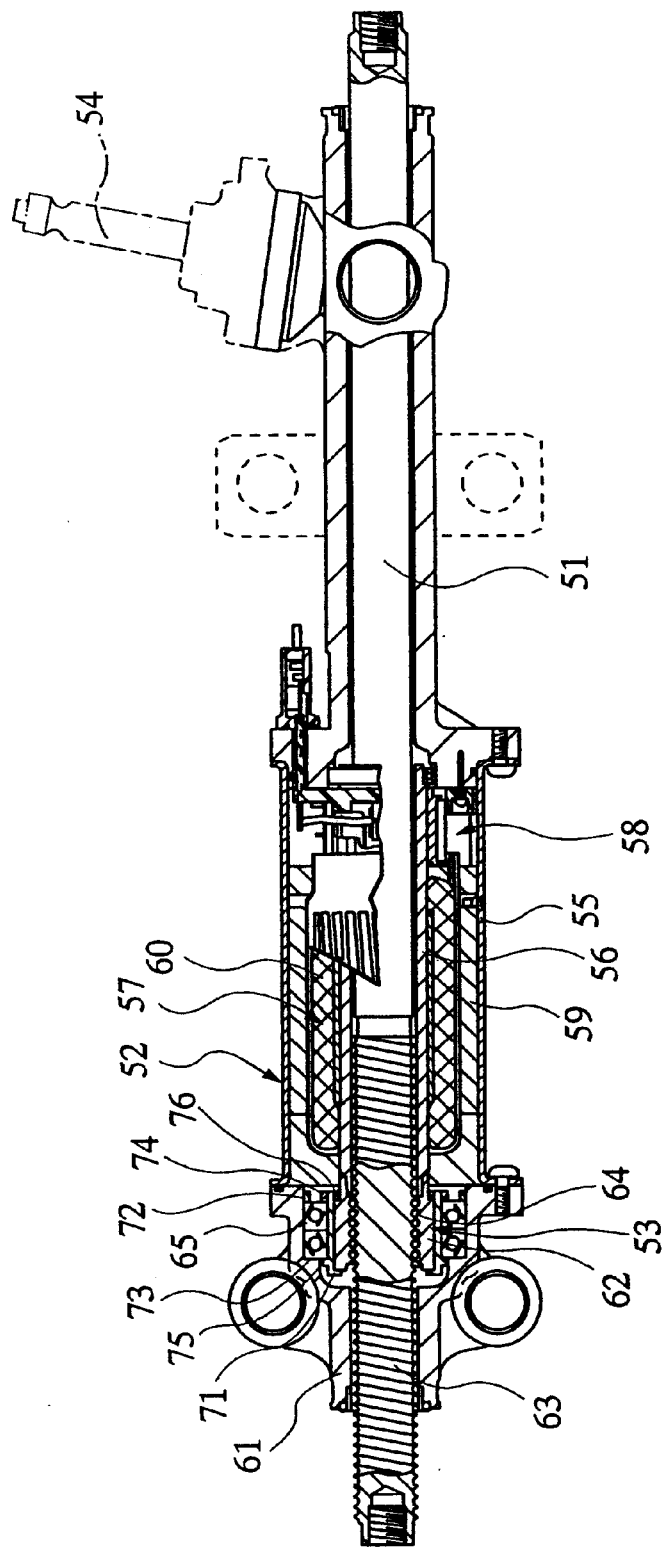
FIG. 5 is a cross-sectional view showing the structure of a conventional electric power steering unit.

As seen from FIGS. 1 and 2, the electric power steering unit (hereinafter referred to as "power steering unit") is provided with an electric motor 1 having a hollow central area and arranged around a rack-shaft 2 as in the case of the conventional power steering units shown in FIG. 5 and, for example, the unit is fitted to the steering gear of the wheels of a vehicle that are typically the front wheels. The steering assisting power generated by the motor 1 is transmitted to the rack-shaft 2 via a ball screw mechanism 3 to reduce the physical load for steering the vehicle on the part of the driver.

As shown in FIG. 1, the power steering unit further comprises a housing A and a housing B, which are securely coupled to yoke 7 of the motor 1 by means of a plurality of respective screws 8a and 8b, and the rack-shaft 2 is arranged in them in such a way that it may be moved to the right and the left direction in FIG. 1. Then, the power steering unit is fitted to the vehicle main body by means of a bracket 9 and fitting holes 10 of the housing B and, at the same time, the wheels are linked to the respective ends of the rack-shaft 2 by means of tie rods or knuckle arms.

The housing A is a hollow member typically made of cast iron or die-cast aluminum and a coupling section 6 is arranged at the right side end of the unit in FIG. 1 for coupling the rack-shaft 2 with the steering column 5 of the vehicle that is further linked to the steering wheel. In this coupling section 6, a pinion (not shown) arranged on the steering column 5 and the teeth of a rack arranged on the outer side portion of the rack-shaft 2 are engaged with each other so that the rotary motion of the steering column 5 is converted into a reciprocative motion of the rack-shaft 2 that moves right and left direction in FIG. 1. In this case, the coupling section 6 is so designed as to support the rack-shaft 2 by gear engagement. Note, a torque sensor (not shown) is arranged on the coupling section 6 to detect the torque of the steering column 5 so that the power output of the motor 1 may be controlled as a function of the detected torque.

The motor 1 has a cylindrical yoke 7 containing coaxially therein a cylindrical armature shaft 11 and a field device 12. The rack-shaft 2 is assembled to run through the inside of the armature shaft 11. The field device 12 comprises a plurality of magnets 14 arranged on the inner peripheral surface of the yoke 7 and an armature core 15 arranged on the outer peripheral portion of the armature shaft 11 and is fed with electric power from a power supply section 13.

The yoke 7 is a hollow and cylindrical member made of iron and having a profile of a cylindrical pipe with a substantially constant thickness. It contains therein the field device 12 and the power supply section 13. The yoke 7 is securely and airtightly connected to the housing A at the right side end thereof in FIG. 1 by means of a plurality of screws 8a and an O-ring 16. On the other hand, it is securely connected to the housing B at the left side end in FIG. 1 also by means of a plurality of screws 8b.

The magnets 14 of the field device 12 operates as field poles and are arranged peripherally at regular intervals in the yoke 7. On the other hand, the armature shaft 11 is held at an end thereof (the right side end in FIGS. 1 and 2) by a bearing 17 fitted to the housing A and provided on the other end (the left side end in FIGS. 1 and 2) with a tapered spline 18, which is engaged with a corresponding spline 20 formed at an end of a nut section 19 of the ball-and-screw mechanism 3 so that the rotary motion of the armature shaft 11 is transmitted to the nut 19.

A rubber member 21 is fitted to a right side portion of the bearing 17 to urge the armature shaft 11 against the side of the nut 19 by means of the elastic force of the rubber 21. Thus, the spline 18 is urged against and engaged with the spline 20 so that the rotary motion of the armature shaft 11 is securely transmitted to the nut 19. Because of the rubber 21 arranged on the right side of the bearing 17, the armature shaft 11 is held in position but allowed to move to a small extent. Note that the rubber 21 can be replaced by an equivalent member that may be made of any appropriate material and have any contour so long as it axially urges the armature shaft 11. For example, it may be replaced by a coned disc spring, a wave washer or a member made of synthetic resin.

The power supply section 13 is designed to feed the armature with electricity and comprises a commutator 22 rigidly secured to the armature shaft 11 and a brush 23 held in contact with the peripheral surface of the commutator 22 to provide electric contact points between them. The brush 23 is held in a brush holder formed integrally with a brush holder stay 24 that is made of synthetic resin and pressed against the commutator 22 under a predetermined pressure by means of an elastic member (not shown). On the other hand, a terminal plate 26 having an end connected to a pig tail 25 of the brush 23 by spot welding is made to run through a projecting section 24a of the stay 24 by means of an insertion molding technique. Then, the stay 24 is secured to the housing A with screws in such a way that the front end of the section 24a is projecting to the outside through a hole 27 of the housing A. Thus, the plate 26 projects from the housing A with the section 24a of the stay 24 to form a power supply terminal.

The housing B is, like the housing A, a hollow member typically made of cast iron or die-cast aluminum and provided in the inside with a ball-and-screw mechanism 3. The ball-and-screw mechanism 3 per se is known and comprises a nut 19, a screw section 30 formed on the outer peripheral wall of the rack-shaft 2 and a number of balls 31 arranged between the nut 19 and the screw 30 and movably provided in a circulation passage 45 formed inside the nut 19. The rack-shaft 2 is supported by the nut 19 in such a way that its rotary motion around the axis of rotation is restricted but it is reciprocated right and left direction in FIG. 1 as the nut 19 is rotated.

Figure 6:
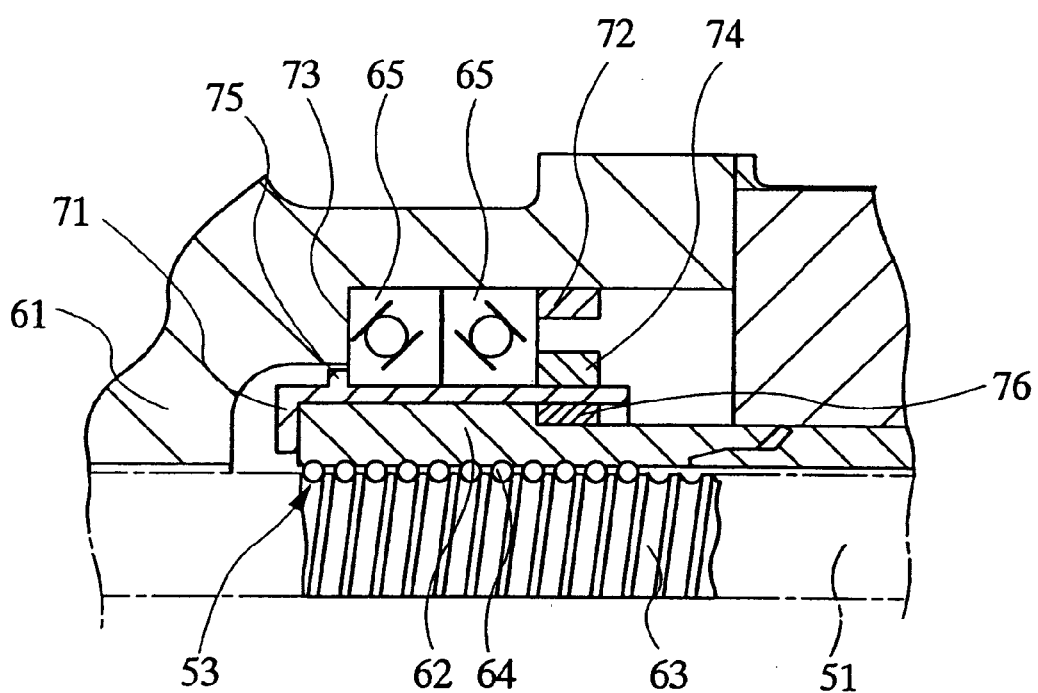
FIG. 6 is an enlarged view showing the main part of the electric power steering unit shown in FIG. 5.
Figure 7:
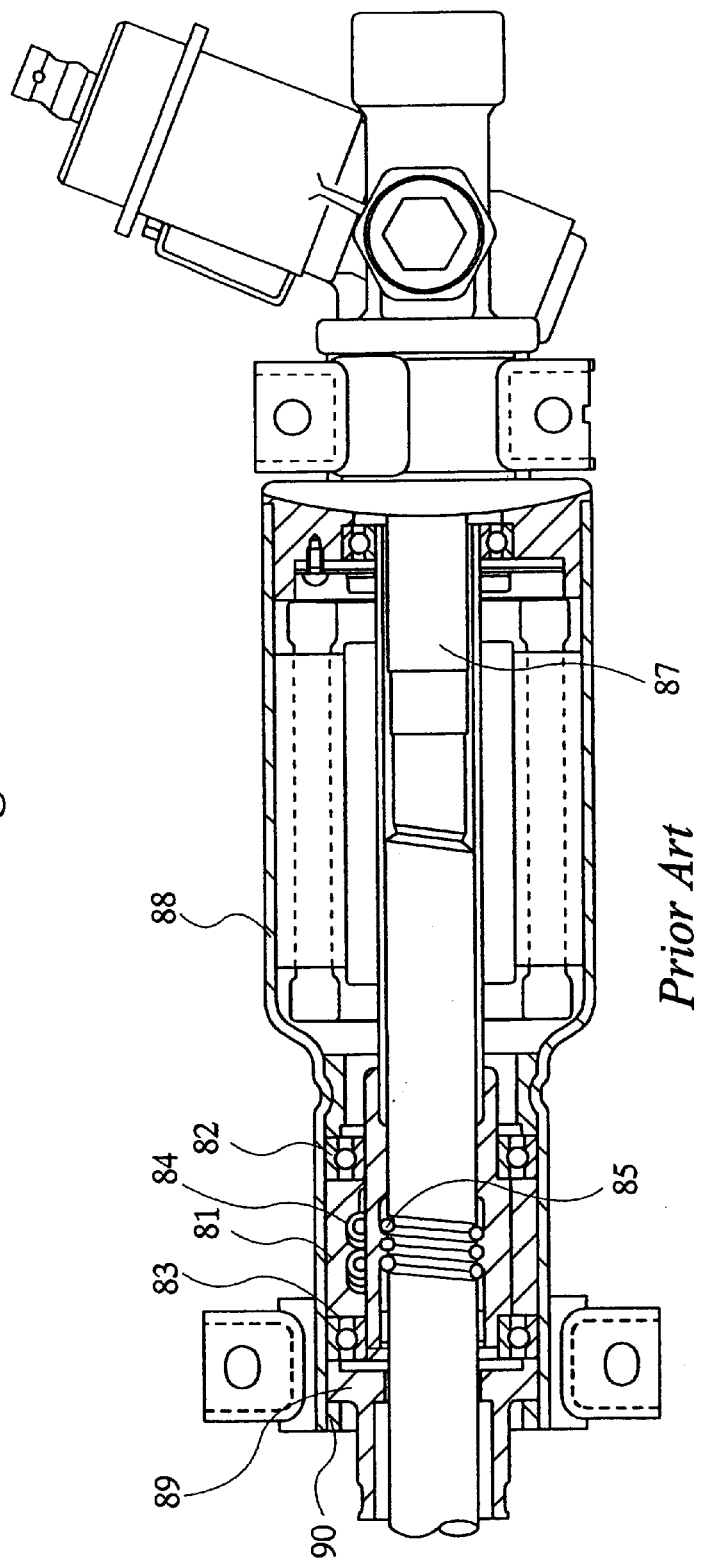
FIG. 7 is a cross-sectional view showing the structure of another conventional electric power steering unit.

The nut 19 is axially rotatable relative to the housing B with an angular bearing 4 interposed therebetween and securely fitted to the housing B. Here, shown in FIG. 2, the angular bearing 4 in the present power steering unit comprises two outer rings 33a and 33b, an inner ring integrated with the nut 19, and balls (or rolling members) 34a and 34b provided between the nut 19 and the outer rings 33a and 33b. That is, the nut 19 is constructed in a structure which also serves as the inner ring of the angular bearing 4 and can support the nut 19 without using a spacer as in a conventional unit. Therefore, the spacer 71 and the inner ring as well as the rings 74 and 76 for fixing the inner ring and the nut as shown in FIGS. 5 and 6 can be omitted. Accordingly, the number of components can be reduced to reduce the cost of the product. In addition, the outer diameter of the product can be reduced since the spacer and the inner ring can be omitted. Further, the inertia can be reduced at the portion since the number of components is small.

Also, in the power steering unit, the balls 34a and 34b are provided between the outer rings 33a and 33b and both corner shoulders 19a and 19b of the nut 19 corresponding thereto, respectively. In this case, the outer ring 33a is pressured in the axial direction by an outer ring fixing ring (or pre-load member) 32, and the outer rings 33a and 33b, the balls 34a and 34b, and the nut 19 are contained and fixed between the ring 32 and a stepped section 35 formed in the housing B. In this time, if the outer ring 33a is pressed in the axial direction to fix the nut 19 into the housing B, the pressure force is transmitted to the nut 19 through the outer ring 33a and the ball 34a. However, in the unit according to the present invention, the balls 34a and 34b are provided at both shoulders of the nut 19, and therefore, a force is mainly applied to the outer portion of the nut 19. The balls 31 and the passage 45 are not applied with a force. Accordingly, a stress is not caused at the balls 31 thereby causing deformation and the passage 45 itself is not deformed thereby preventing movement of the balls 31.

The above described embodiment of power steering unit is assembled in a manner as described below.

Firstly, said four major components are prepared. The rubber 21, the bearing 17, the stay 24 and other parts are fitted to the housing A. Then, the magnets 14 and other parts are fitted to the inside of the yoke 7. The armature core 15, the commutator 22 and other parts are arranged on the armature shaft 11. The ball-screw mechanism 3 combining the angular bearing 4 and the rack-shaft 2 are arranged in the housing B.

Here, those components that constitute the angular bearing 4, e.g., the outer rings 33a and 33b and the balls 34a and 34b are integrally formed before the components are assembled in the housing B. The outer ring 34b of the integral components is engaged into contact with the stepped section 35 of the housing B, and the ring 32 is screwed on from the side of the outer ring 33a, to fix the entire components. In this time, the pressure force applied to the outer ring 33a in the axial direction is adjusted by the screwing amount with which the ring 32 is screwed. Note that the pressure force at this time is mainly transmitted to the outer portion of the nut 19 in the radial direction but is not transmitted to the ball 31 or the passage 45.

The housing B is assembled as the mentioned above, then, the housing A and the armature shaft 11 are fitted to each other and the yoke 7 is secured to the housing A by means of screws. The housing B carrying the rack-shaft 2 and the yoke 7 are secured to each other also by means of screws. For fitting the housing B to the yoke 7, the spline 18 formed on the end of the armature shaft 11 is engaged with the spline 20 formed on the nut 19, after then the yoke 7 and the housing B are secured to each other by means of screws. Thus, with this embodiment of power steering unit, the housing B can be secured to the yoke 7 after positionally regulating it in order to prevent the rack-shaft 2 from falling down and/or shaking so that any misalignment on the part of the rack-shaft 2 due to eccentricity from the center may be absorbed and corrected. Note that yoke 7 is provided with a hole 36 for receiving the screw 8b having a diameter greater than that of the screw 8b so that the housing B may be positionally regulated by utilizing the clearance between the screw 8b and the screw hole 36. Thereafter, the rack-shaft 2 put into the housing A is linked to the steering column 5 and the teeth of the pinion on the steering column 5 are made to engage with those of the rack on the rack-shaft 2.

Now, the embodiment of power steering unit of the invention operates in a manner as described below. Firstly, as the handle is operated by the driver to turn the steering column 5 and the rack-shaft 2 is moved in the direction corresponding to the sense of rotation of the steering column 5 to carry out a necessary steering operation. At the same time, a steering torque sensor (not shown) detects the torque generated by the rotary motion of the steering column 5 and consequently the commutator 22 is supplied with electric power corresponding to the detected torque from the terminal plate 26 having the coupler 28 via the brush 23. As the motor 1 is driven to operate the armature shaft 11 and hence the nut 19 coupled to it are rotated. As the nut 19 rotates, the steering assisting power is transmitted to the rack-shaft 2 under the effect of the ball-and-screw mechanism 3, whereby the movement of the rack-shaft 2 is promoted and the steering power is assisted.

Figure 3:
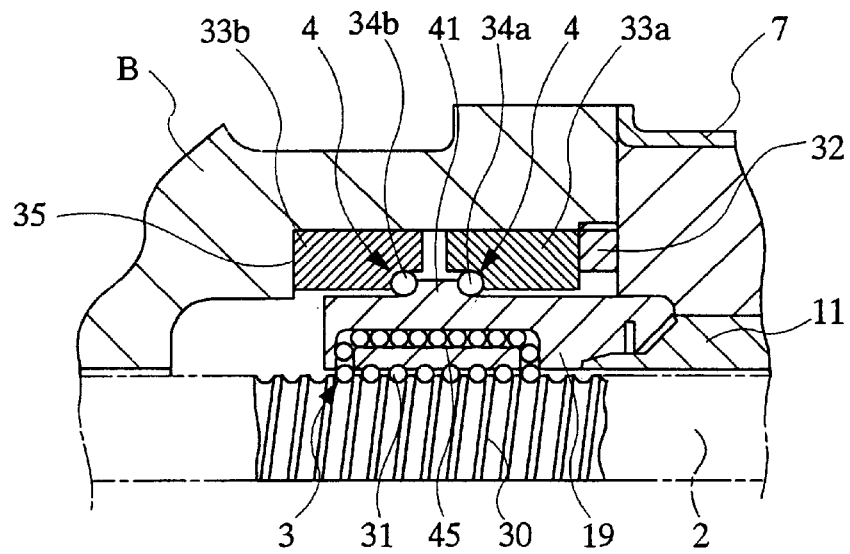
FIG. 3 is an enlarged cross-sectional view showing the main part of the power steering unit as the embodiment 2 according to the present invention.

Next, explanation will be made to the power steering unit as a second embodiment according to the present invention. FIG. 3 is an enlarged cross-sectional view of the main part of the power steering unit as the second embodiment according to the present invention. In this case, the same portions as those of the power steering unit of the first embodiment are denoted by same reference symbols, and detailed explanation thereof will be omitted herefrom. Also, the other portions than those shown in FIG. 3 are the same as those shown in FIG. 1, and detailed explanation thereof will be omitted herefrom.

The power steering unit shown in FIG. 3 is constructed in a structure in which a flange 41 projecting in the radial direction is provided on the outer circumference of the nut 19, and balls 34a and 34b are provided in both sides of the flange 41. Also, in this case, the pressure force by the ring 32 is applied to the flange 41 but is not transmitted to the ball 31 or the passage 45.

Figure 4:
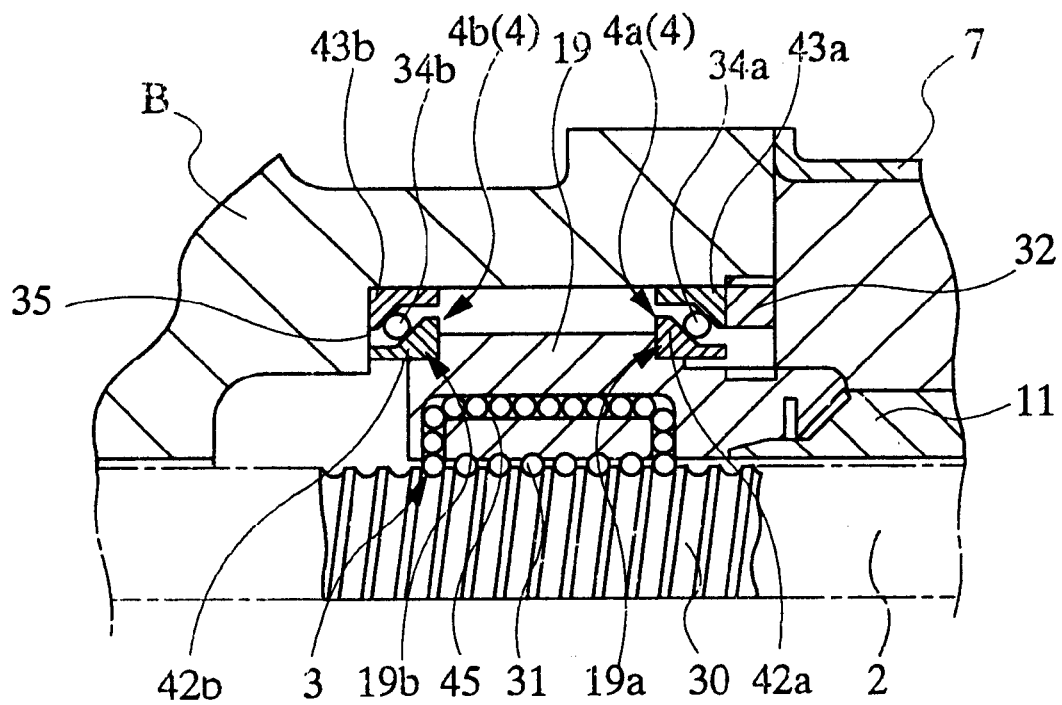
FIG. 4 is an enlarged cross-sectional view showing the main part of the power steering unit as the embodiment 3 according to the present invention.

Further explanation will be made of a power steering unit as a third embodiment according to the present invention. FIG. 4 is an enlarged cross-sectional view of the power steering unit as the third embodiment of the present invention. Also, in this case, the same portions as those of the power steering unit of the embodiment 1 are denoted by same reference symbols, and detailed explanation thereof will be omitted herefrom. Also, the other portions than those shown in FIG. 4 are the same as those shown in FIG. 1, and detailed explanation thereof will be omitted herefrom.

The power steering unit shown in FIG. 4 is constructed in a structure which uses a conventional angular bearing 4 having outer and inner rings, which are respectively provided at both corner shoulders 19a and 19b of the nut 19. That is, inner rings 42a and 42b are respectively attached to both corner shoulders 19a and 19b of the nut 19, and angular bearings 4a and 4b are formed by the inner rings 42a and 42b, outer rings 43a and 43b attached inside the housing B, and balls 34a and 34b provided between the outer rings and the inner rings. The outer ring 43a is fixed by a ring 32.

Also, in this case, the pressure force by the ring 32 is transmitted to the nut 19 through the inner ring 42a. Since the inner rings 42a and 42b are provided at both corner shoulders 19a and 19b of the nut, the force is applied to the outer portion of the nut 19 in the radial direction but is not transmitted to the ball 31 or the passage 45.

Detailed description has hereinabove been give of the invention achieved by the present inventor with reference to the embodiments. However, the present invention should not be limited to the embodiments described above and may be variously modified within the scope not departing from the gist.

For example, a brushless electric motor may be used for an power steering unit according to the invention. If such is the case, the field device has a core and magnets respectively arranged on the yoke side and the armature shaft side while the power supply section has a circuit board comprising conducting means and a detector for detecting the angular position of the armature shaft. Additionally, the present invention is applicable not only to front wheels steering unit but also to rear wheels steering unit having the same constitution and mounting condition as the front wheels steering unit.

Finally, while the present invention is described particularly in terms of power steering unit of motor vehicle, it may be applied to any industrial machines and vehicles provided with a steering system.

The advantages of the present invention may be summarized as follows.

That is, since the nut of the ball screw mechanism is supported by the angular bearing, at a position where a stress is not caused at the balls of the ball screw mechanism, a stress is not caused at the balls of the ball screw mechanism by the pressure force applied to the angular bearing when attaching the nut. Accordingly, the balls and the circulation passage can be prevented from being deformed thereby hindering circulation movement of the balls.

What is claimed is:

1. An electric power steering unit comprising a rack-shaft to be coupled to the guiding wheels of a vehicle, an electric motor coaxially arranged around the rack-shaft to supply assisting power to the rack-shaft, a ball screw mechanism for connecting a nut section linked to the armature shaft of the electric motor with a screw section formed on the rack-shaft by disposing ball members therebetween and for transmitting the rotary power of the electric motor to the rack-shaft as assisting power for steering, and a housing comprising a bearing for rotatably supporting said ball screw mechanism, characterized in that:

said bearing comprises an outer ring pressed and fixed in an axial direction in said housing by a pre-load pressure member, and a rolling member which is provided between said outer ring and said nut section of said ball screw mechanism with the rolling member directly contacting the nut section, and the nut section has a ball circulation passageway with a radially outermost portion and also has a radially outer portion extending radially outwardly from the radially outermost portion of the circulation passageway, the rolling member being in angular contact with the outer portion of the nut section radially outwardly from the radially outermost portion of the circulation passageway so that an axially directed component of force applied by the rolling member to the nut section is located radially outwardly of the radially outermost portion of the circulation passageway so that a stress is not caused at a ball member of said ball screw mechanism by a pressure force applied to said outer ring.

2. A power steering unit according to claim 1, characterized in that:

said outer ring comprises two ring members separated from each other in an axial direction, and a rolling member is provided between each of said ring members and the radially outer portion of said nut section.

3. A power steering unit according to claim 1, characterized in that:

said outer ring comprises two ring members separated from each other in an axial direction, said radially outer portion of the nut section has a flange section projecting in a radially outward direction with two side surface portions and a rolling member is provided between each of said side surface portions of said flange section and a respectively associated one of said two ring members.

4. An electric power steering unit comprising a rack-shaft to be coupled to the guiding wheels of a vehicle, an electric motor coaxially arranged around the rack-shaft to supply assisting power to the rack-shaft, a ball screw mechanism for connecting a nut section linked to the armature shaft of the electric motor with a screw section formed on the rack-shaft by disposing ball members therebetween and for transmitting the rotary power of the electric motor to the rack-shaft as assisting power for steering, and a housing comprising a bearing for rotatably supporting said ball screw mechanism, characterized in that:

said bearing comprises an outer ring pressed and fixed in an axial direction in said housing by a pre-load pressure member, and a rolling member which is provided between said outer ring and said nut section of said ball screw mechanism with the rolling member directly contacting the nut section, and the nut section has a ball circulation passageway with a radially outermost portion and also has a radially outer portion extending radially outwardly from the radially outermost portion of the circulation passageway, the rolling member being in angular contact with the outer portion of the nut section radially outwardly from the radially outermost portion of the circulation passageway so that an axially directed component of force applied by the rolling member to the nut section is located radially outwardly of the radially outermost portion of the circulation passageway so that a pressure force applied to said outer ring is not applied to the circulation passageway of the ball screw mechanism.

5. A power steering unit according to claim 4, characterized in that:

said outer ring comprises two ring members separated from each other in an axial direction, and a rolling member is provided between each of said ring members and the radially outer portion of said nut section.

6. A power steering unit according to claim 4, characterized in that:

said outer ring comprises two ring members separated from each other in an axial direction, said radially outer portion of the nut section has a flange section projecting in a radially outward direction with two side surface portions, and a rolling member is provided between each of said side surface portions of said flange section and a respectively associated one of said two ring members.

7. An electric power steering unit comprising a rack-shaft to be coupled to the guiding wheels of a vehicle, an electric motor coaxially arranged around the rack-shaft to supply assisting power to the rack-shaft, a ball screw mechanism for connecting a nut section linked to the armature shaft of the electric motor with a screw section formed on the rack-shaft by disposing ball members therebetween and for transmitting the rotary power of the electric motor to the rack-shaft as assisting power for steering, and a housing comprising a bearing for rotatably supporting said ball screw mechanism, characterized in that:

said bearing comprises an outer ring pressed and fixed in an axial direction in the housing by a pre-load pressure member, an inner ring fixed to a corner of said nut section of said ball screw mechanism, and a rolling member provided between said outer ring and said inner ring and in angular contact with both said outer ring and said inner ring, and the nut section has a ball circulation passageway with a radially outermost portion and also has a radially outer portion extending radially outwardly from the radially outermost portion of the circulation passageway, the inner ring being in contact with the outer portion of the nut section radially outwardly from the radially outermost portion of the circulation passageway so that an axially directed component of force applied by the rolling member to the inner ring is located radially outwardly of the radially outermost portion of the circulation passageway so that a stress is not caused at a ball member of said ball screw mechanism by a pressure force applied to said outer ring.

8. A power steering unit according to claim 7, characterized in that;

said radially outer portion of the nut section has two corners, said inner ring comprises two inner ring members each arranged at a respective one of said corners, and a rolling member is provided between each of the inner ring members and the outer ring.

9. An electric power steering unit comprising a rack-shaft to be coupled to the guiding wheels of a vehicle, an electric motor coaxially arranged around the rack-shaft to supply assisting power to the rack-shaft, a ball screw mechanism for connecting a nut section linked to the armature shaft of the electric motor with a screw section formed on the rack-shaft by disposing ball members therebetween and for transmitting the rotary power of the electric motor to the rack-shaft as assisting power for steering, and a housing comprising a bearing for rotatably supporting said ball screw mechanism, characterized in that:

said bearing comprises an outer ring pressed and fixed in an axial direction in said housing by a pre-load pressure member, an inner ring fixed to a corner of said nut section of said ball screw mechanism, and a rolling member provided between said outer ring and said inner ring and in angular contact with both said outer ring and said inner ring, and the nut section has a ball circulation passageway with a radially outermost portion and also has a radially outer portion extending radially outwardly from the radially outermost portion of the circulation passageway, the inner ring being in contact with the outer portion of the nut section radially outwardly from the radially outermost portion of the circulation passageway so that an axially directed component of force applied by the rolling member to the inner ring is located radially outwardly of the radially outermost portion of the circulation passageway so that a pressure force applied to said outer ring is not applied to a circulation passageway.

10. A power steering unit according to claim 9, characterized in that;

said radially outer portion of the nut section has two corners, said inner ring comprises two inner ring members each arranged at a respective one of said corners, and a rolling member is provided between each of the inner ring members and the outer ring.

* * * * *